Jan. 25, 1955  W. A. WOOD  2,700,340
FUEL PUMP
Filed June 28, 1951
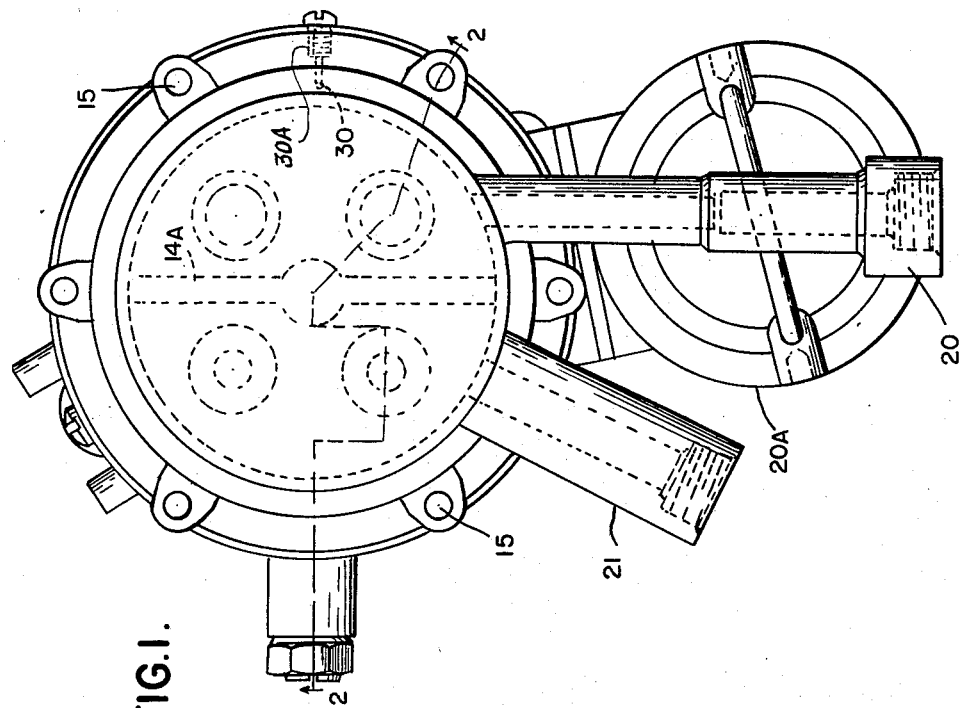
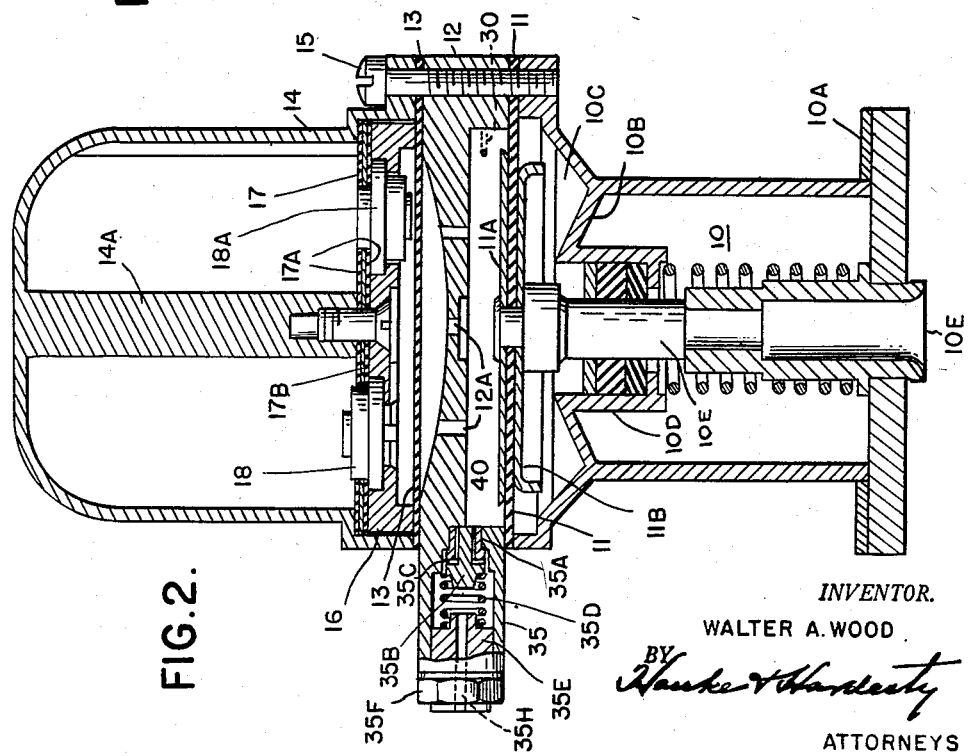
INVENTOR.
WALTER A. WOOD
BY
*Hauke & Hardesty*
ATTORNEYS

United States Patent Office 2,700,340
Patented Jan. 25, 1955

2,700,340

FUEL PUMP

Walter A. Wood, Oak Park, Ill.

Application June 28, 1951, Serial No. 234,025

1 Claim. (Cl. 103—44)

The present invention relates to fuel pumps for internal combustion engines and specifically to improvements on the pump as described and claimed in my application Serial No. 45,095, filed August 19, 1948, now U. S. Patent No. 2,635,545, of April 21, 1953.

In the said application, the pump is described and shown as a diaphragm pump including two diaphragms, one of which is positively mechanically actuated in one direction by means of a push rod in turn actuated from a suitable engine part while being returned by means of a suitable spring. By this means, the diaphragm always moves its full stroke.

The second diaphragm is spaced from the first and is actuated thereby through the alternate compression and distention of the air column trapped in the intervening space.

Among the objects of the present invention is to improve the construction of such pumps by simplifying the construction.

Another object is to provide means for controlling the air pressure in the chamber between the diaphragms.

Other objects will readily occur to those skilled in the art upon reference to the following description and the accompanying drawing in which Fig. 1 is a top plan view of the pump; and Fig. 2 is a section of the upper portion of the pump on the line 2—2 of Fig. 1.

In the drawings, the pump is shown as consisting of a lower or base member 10 provided with a mounting flange 10A. The member 10 is sufficiently below the top to provide a chamber 10C, and at its central portion is provided with a depending cylindrical packing gland 10D through which extends a longitudinally reciprocable rod 10E adapted to coact with a suitable engine part (not shown), causing such reciprocation. A suitable spring will be used to produce return reciprocations of the rod.

The upper end of member 10 is shown to be closed by means of a diaphragm 11 to the center of which is fixed the rod 10E, suitable plates 11A and 11B being used to restrict the flexing of the diaphragm to the peripheral portion.

The structure so far described is identical with that of the corresponding portion of the pump shown in the application referred to above, the chamber 10C being utilized, as in the other case, as an air pump chamber.

Above the diaphragm 11 is a plate-like element 12 suitably dished on both faces and provided with open passages 12A furnishing communication between the upper and lower faces.

Above the plate 12 is a second diaphragm 13 and above the latter a domed member 14, the three members 10, 12, and 14 together constituting the pump housing and with the intervening diaphragms 11 and 13 are fixed tightly together by means of suitable screws 15, the diaphragm edges serving as suitable sealing gaskets.

As shown clearly in Fig. 2, the domed member 14 is so formed at its lower portion as to provide a recess for the accommodation of a valve retainer 16 and gasket 17, the latter comprising two layers 17A of sealing and gasket material with a layer of sheet metal 17B interposed so as to provide a relatively rigid member capable of holding the valve units against movement. The valve units 18 and 18A comprise small metallic housings open at both ends and enclosing suitable disc valves and springs and, since the form of valve forms no part of the present invention, no detailed description is thought necessary.

As illustrated, valves 18A open downwardly and valves 18 open upwardly.

As indicated in Fig. 1, the member 14 is divided by a partition 14A and each compartment thus formed is provided with two valves in order to reduce internal resistance.

In Fig. 1, the fuel inlet is shown at 20, the conventional filter for incoming fuel being shown at 20A. This inlet 20 leads into the domed member on one side of the partition 14A while the fuel outlet 21 leads from the member 14 from the other side of the partition.

In the operation of the pump, the diaphragm 11 is constantly actuated through its full stroke by the rod 10E and its return spring, the rod being in turn actuated by a suitable part (not shown) of the engine. The oscillation of the diaphragm 11 causes in turn oscillation of diaphragm 13, the movement being transmitted through the alternate compression and rarefaction of the air confined in the space between the two.

If the conditions are such as to allow full oscillation of diaphragm 13, such oscillations will take place and the pump will deliver its full capacity. However, it is more often the case that less than the full capacity is needed or desired. For example, when the engine is being operated at high speed under light load. In such cases means must be provided to reduce the effect of the oscillations of diaphragm 11 on diaphragm 13.

Such means is shown at 30 and 35 in the figures. At 30 is shown a small, substantially capillary, passage opening into the intra-diaphragm space 40 from the outside and regulable by means of a suitable screw 30A, as shown in my United States Patent No. 2,289,617.

The means shown at 35 consists of a suitable boss formed on the plate 12 and having an axial passage therethrough into the space 40. At the inner end of the passage a suitable bushing 35A provides a port in constant communication with the air chamber 40, and said bushing also serves as a guide for the stem of a small valve 35B, the head of which may seat itself on the outer end of the bushing, a suitable ring of seating material 35C being used. The valve 35B is maintained in closed or seated position by means of a suitable spring 35D, the tension of which may be adjusted by means of a screw 35E threaded into the boss and maintained in position by means of locknut 35F. The screw 35E is provided with an axial passage 35H and the stem of valve 35B provided with sufficient clearance in the bushing 35A to permit air flow when the valve is lifted from its seat.

In the operation of the pump, when fuel demand is low or drops quickly, back pressure of the fuel builds up in the line connected to the outlet 21 and in the compartment of the domed member 14 from which said outlet leads. Such pressure tends to prevent opening of the valves 18 through which the fuel is forced into said compartment by the diaphragm 13 and thus pressure is increased in the space between said diaphragm and the valve retainer 16, which tends to reduce the flexing of the diaphragm. Since the diaphragm 11 is being constantly positively reciprocated a uniform distance, the resistance of the diaphragm 13 to flexing by reason of the increased pressure above it tends to increase the air pressure in chamber 40, and since such air cannot escape rapidly enough through the capillary passage 30, the valve means 35B opens and provides for quick escape of air from chamber 40 so that the thrust against diaphragm 13 is decreased. As no air can return through the valve, normal pressure is built up again through the passage 30.

I claim:

A fuel pump for internal combustion engines, comprising housing means including a member having centrally located recesses communicating with each other and having a pair of spaced flexible diaphragms covering said recesses, said recessed member also having a peripheral portion surrounding said recesses and said diaphragms being secured to said peripheral portion to provide a sealed air chamber, such peripheral portion of said member being provided with a capillary air passage affording constant communication between said air chamber and the external atmosphere, and said peripheral portion also having an air escape passage having a port in constant communication with the air chamber; valved means for conducting fuel to and from the outward face of one of said diaphragms for pumping action thereby; means for positively reciprocating the other of said diaphragms a uniform distance, whereby to flex the first mentioned diaphragm through fluid pressure thereon from within said air chamber; and means for constantly regulating the quantity of fuel pumped by said first mentioned diaphragm in accordance with the requirements of the engine, comprising an outwardly opening check valve controlling said air escape passage from the air chamber and at all times subject and responsive to pressure variations in such chamber resulting from back pressure on the fuel in the means for conducting it from the first mentioned diaphragm.

References Cited in the file of this patent

UNITED STATES PATENTS

| Number | Name | Date |
|---|---|---|
| 915,362 | Krause | Mar. 16, 1909 |
| 1,650,377 | Nixon | Nov. 22, 1927 |
| 2,289,617 | Wood | July 14, 1942 |
| 2,464,196 | Van Ranst | Mar. 8, 1949 |
| 2,469,818 | Erickson | May 10, 1949 |